US012515952B2

(12) United States Patent
Mesuda et al.

(10) Patent No.: US 12,515,952 B2
(45) Date of Patent: Jan. 6, 2026

(54) GALLIUM NITRIDE PARTICLES AND METHOD FOR PRODUCING SAME

(71) Applicant: TOSOH CORPORATION, Shunan (JP)

(72) Inventors: Masami Mesuda, Ayase (JP); Hideto Kuramochi, Ayase (JP)

(73) Assignee: TOSOH CORPORATION, Shunan (JP)

(*) Notice: Subject to any disclaimer, the term of this patent is extended or adjusted under 35 U.S.C. 154(b) by 1328 days.

(21) Appl. No.: 16/622,737

(22) PCT Filed: Jun. 14, 2018

(86) PCT No.: PCT/JP2018/022788
§ 371 (c)(1),
(2) Date: Dec. 13, 2019

(87) PCT Pub. No.: WO2018/230663
PCT Pub. Date: Dec. 20, 2018

(65) Prior Publication Data
US 2021/0139328 A1 May 13, 2021

(30) Foreign Application Priority Data
Jun. 15, 2017 (JP) ................. 2017-117465

(51) Int. Cl.
H01J 37/34      (2006.01)
C01B 21/06      (2006.01)
C04B 35/58      (2006.01)
C04B 35/626     (2006.01)
C04B 35/64      (2006.01)
C22C 29/16      (2006.01)
C23C 14/34      (2006.01)

(52) U.S. Cl.
CPC .......... C01B 21/0632 (2013.01); C04B 35/58 (2013.01); C04B 35/62605 (2013.01); C04B 35/62695 (2013.01); C04B 35/64 (2013.01); C22C 29/16 (2013.01); C23C 14/3414 (2013.01); H01J 37/3426 (2013.01); C01P 2004/32 (2013.01); C01P 2004/51 (2013.01); C01P 2004/61 (2013.01); C01P 2006/80 (2013.01); C04B 2235/3286 (2013.01); C04B 2235/465 (2013.01); C04B 2235/5436 (2013.01); C04B 2235/5463 (2013.01); C04B 2235/549 (2013.01); C04B 2235/6567 (2013.01); C04B 2235/6586 (2013.01); C04B 2235/662 (2013.01); C04B 2235/723 (2013.01)

(58) Field of Classification Search
CPC ................ C01B 21/0632; C04B 35/58; C04B 35/62605; C04B 35/62695; C04B 35/64; C04B 2235/3286; C04B 2235/465; C04B 2235/5436; C22C 29/16; C23C 14/3414; H01J 37/3426; C01P 2004/32; C01P 2004/51; C01P 2004/61; C01P 2006/80
USPC ........................................ 204/298.12, 298.13
See application file for complete search history.

(56) References Cited

U.S. PATENT DOCUMENTS

| 5,942,148 A * | 8/1999 | Preston ................. C04B 35/645 264/668 |
| 2005/0238562 A1* | 10/2005 | Ponce ................. C01B 21/0632 423/409 |
| 2006/0163605 A1* | 7/2006 | Miyahara .............. C04B 35/581 257/E33.003 |
| 2007/0141819 A1 | 6/2007 | Park et al. |
| 2013/0108537 A1* | 5/2013 | Mikawa ................ C30B 29/403 423/351 |
| 2013/0273346 A1 | 10/2013 | Mesuda et al. |
| 2018/0072570 A1 | 3/2018 | Mesuda et al. |

FOREIGN PATENT DOCUMENTS

| JP | 2009-520678 A | 5/2009 |
| JP | 2012-144424 A | 8/2012 |
| JP | 2013-129568 A | 7/2013 |
| JP | 2014-234336 A | 12/2014 |
| JP | 2015-180599 A | 10/2015 |
| WO | WO 2016/158651 A1 | 10/2016 |

OTHER PUBLICATIONS

Hara et al. "Vapor Phase Synthesis of Fluorescent Gallium Nitride Powders", Jpn. J. Appl. Phys. vol. 40 (2001) L242-244. (Year: 2001).*
International Search Report issued Jul. 31, 2018 in PCT/JP2018/022788 filed on Jun. 14, 2018, 2 pages.
Kiyono et al., "Nitridation mechanism of β-Gallium Oxide by Ammonia and Fabrication of Gallium-Nitride Nano-particles and Nano-rods," Journal of the Japanese Association for Crystal Growth, 2010, vol. 37, No. 4, pp. 304-309.
Janik et al., "Tuning aerosol-assisted vapor phase processing towards low oxygen GaN powders," Physica Status Solidi (a), 2006, vol. 203, No. 6, pp. 1301-1306, DOI 10.1002/pssa.200566134.

* cited by examiner

Primary Examiner — Rodney G Mcdonald
(74) Attorney, Agent, or Firm — Oblon, McClelland, Maier & Neustadt, L.L.P.

(57) ABSTRACT

Provided are gallium nitride particles that have a low oxygen content and a high moldability and allow a gallium nitride sputtering target having a high density and a high strength to be produced. By causing a mixed powder of gallium oxide and gallium nitride to react at a temperature of 1000-1100° C. such that an ammonia reaction amount per hour is 1 or more times (by mole) an amount of gallium charged, gallium nitride particles are obtained of which an oxygen content is 1 atm % or less, an average particle size of primary particles is 5 μm or more, and a particle size of a range of 10 area % from smallest particles of a particle size distribution (10% particle size) is 3 μm or less.

13 Claims, No Drawings

GALLIUM NITRIDE PARTICLES AND METHOD FOR PRODUCING SAME

CROSS-REFERENCE TO RELATED APPLICATIONS

The present application is a 35 U.S.C. § 371 national stage patent application of International patent application PCT/JP2018/022788, filed on Jun. 14, 2018, which is based on and claims the benefits of priority to Japanese Application No. 2017-117465, filed on Jun. 15, 2017. The entire contents of these applications are incorporated herein by reference.

TECHNICAL FIELD

The present invention relates to gallium nitride particles used as a raw material of a gallium nitride sintered body which is used when a gallium nitride thin film is produced using a sputtering method.

TECHNICAL BACKGROUND

Gallium nitride is attracting attention as a raw material for a light emitting layer of a blue light emitting diode (LED) or for a blue laser diode (LD). In recent years, gallium nitride has been used in various applications such as a white LED or a blue LD in a form of a thin film or a substrate. Further, gallium nitride is also attracting attention as a material for applications such as a power device in the future.

As a method for producing a gallium nitride thin film is a sputtering method using a target can be given. A sputtering target of gallium nitride is produced by molding or sintering a gallium nitride powder. However, there is a problem that, when an oxygen content of the gallium nitride powder as a raw material of the target is large, a gallium nitride film containing a large amount of oxygen is obtained and crystallinity of obtained gallium nitride film deteriorates. Further, there is a problem that, so far, when trying to reduce an oxygen content, particle sizes are increased, and, in particular, when trying to obtain a sintered body of a size exceeding 120 mm, a shape thereof cannot be retained due to insufficient strength.

In general, as a method for producing a gallium nitride powder, a method is known in which metallic gallium is heated to 1000-1200° C. in an ammonia stream to obtain polycrystalline gallium nitride. In this method, since gallium nitride is generated on a surface of metallic gallium, the gallium nitride inhibits contact between internal metallic gallium and an ammonia gas, and a nitriding reaction does not proceed further.

Further, as another method, there is a method in which gallium oxide is heated in an ammonia atmosphere to obtain gallium nitride (for example, see Patent Documents 1-2). Here, a material obtained by fluorescent X-ray or electron probe micro-analyzer (EPMA) is identified as gallium nitride. However, there is no description about an oxygen content of a powder, and there is no detailed description about an ammonia atmosphere.

Further, there is another method for obtaining a gallium nitride powder (for example, see Patent Document 3). However, with this technology, it is difficult to obtain a powder having an oxygen content equal to or lower than a certain level.

Patent Document 4 discloses a technology for obtaining a gallium nitride powder having a low oxygen content. However, the obtained powder was columnar and was not suitable for obtaining a high strength sintered body.

Related Art

Patent Document

Patent Document 1: Japanese Patent Application Laid-Open Publication No. 2002-29713
Patent Document 2: Japanese Patent Application Laid-Open Publication No. 2000-198978
Patent Document 3: Japanese Patent Application Laid-Open Publication No. 2013-129568
Patent Document 4: Japanese Patent Application Laid-Open Publication No. 2006-83055

SUMMARY OF THE INVENTION

Problems to Be Solved by the Invention

A purpose of the present invention is to provide gallium nitride particles that have a low oxygen content and a high moldability and allow a gallium nitride sputtering target having a high density and a high strength to be produced.

Means for Solving the Problems

In view of such a situation, as a result of intensive studies, the present inventors studied nitriding conditions and further found conditions including specific particle size distribution and shapes for obtaining gallium nitride particles having a low oxygen content, and thus accomplished the present invention.

That is, the present invention includes the following [1]-[8].

[1] Gallium nitride particles of which an oxygen content is 1 atm % or less, an average particle size of primary particles is 5 μm or more, and a particle size of a range of 10 area % from smallest particles of a particle size distribution (10% particle size) is 3 μm or less.

[2] The gallium nitride particles according to [1] in which gallium nitride particles that have substantially spherical shapes are 25 area % or more of all the gallium nitride particles.

[3] The gallium nitride particles according to [1] or [2], for which, in a particle size distribution of secondary particles, there are multiple peaks, an apex of a peak (first peak)-on a side of smallest particle sizes is 90 μm or less, and a content rate thereof is 10 wt % or more of all the gallium nitride particles.

[4] A method for producing the gallium nitride particles according to any one of [1]-[3] including: performing a nitriding process in which a mixed powder of gallium oxide and gallium nitride is caused to react at a temperature of 1000-1100° C. for 3 hours or more such that an ammonia reaction amount per hour is 1 or more times (by mole) an amount of gallium charged.

[5] The method for producing the gallium nitride particles according to [4] including: performing a particle growth process in which a reaction is caused to occur at a temperature of 1050-1200° C. for 3 hours or more such that an ammonia reaction amount per hour is 2 or more times (by mole) an amount of gallium charged, and a final ammonia/gallium molar ratio is 50 or more and less than 1000, the particle growth process being performed after the nitriding process at a temperature higher than that of the nitriding process.

[6] A sintered body formed of the gallium nitride particles according to any one of [1]-[3].

A sputtering target formed using the sintered body according to [6].

A thin film formed using the sputtering target according to [7].

In the following, the present invention is described in detail. However, the present invention is not limited to the following embodiment.

The gallium nitride particles of the present invention are characterized in that an oxygen content thereof is 1 atm % or less, preferably 0.5 atm % or less, more preferably 0.3 atm % or less, and particularly preferably 0.2 atm % or less. As a result, an oxygen content of gallium nitride after sintering can be reduced.

Further, the gallium nitride is characterized in that an average particle size of primary particles thereof is 5 μm or more, and a particle size of a range of 10 area % from smallest particles of a particle size distribution (10% particle size) is 3 μm or less. The average particle size here refers to a 50% particle size in an area of primary particles observed using a scanning electron microscope or the like. The 10% particle size refers to a particle size in a range of 10 area % from smallest particle of a particle size distribution measured using the same method.

It is necessary for the average particle size of the primary particles to be 5 μm or more, preferably 7 μm or more, and more preferably 10 μm or more. As a result, influence of surface oxidation can be reduced, the oxygen content can be further reduced, and a density during sintering can also be improved. Further, since there are few surface layers, decomposition at a high temperature that normally occurs can also be suppressed to some extent, and a firing temperature can also be increased. An upper limit is preferably 150 μm or less, more preferably 100 μm or less, and even more preferably 50 μm or less. When it is larger than 150 μm, a surface is small and it is extremely difficult to carry out sintering.

It is necessary for the 10% particle size of the primary particles to be 3 μm or less, preferably 2.5 μm or less, and more preferably 2 μm or less. By containing a certain amount of such small particles, not only oxygen is reduced, but also density and strength during firing are improved. However, the 10% particle size is preferably 1 μm or more. The reason for this is that, when it becomes smaller than that, due to influence of surface oxidation of fine particles, influence of increase in oxygen content becomes larger than an effect of improvement in density and strength during sintering.

Further, gallium nitride particles having substantially spherical shapes preferably occupy 25 area % or more of all the gallium nitride particles. When surfaces are formed of curved surfaces, a specific surface area with respect to the particles is reduced, and an amount of surface oxidation can be suppressed. Further, fillability and flowability during firing are also improved, and contact points between particles are also improved, and thus, sintering becomes easier.

In order to obtain that effect, gallium nitride particles having substantially spherical shapes are preferably 25 area % or more, more preferably 30 area % or more, and even more preferably 40 area % or more of all the gallium nitride particles. Thereby, the density and strength during firing can be improved.

An average particle size of the gallium nitride particles having substantially spherical shapes is preferably 5 μm or less, and more preferably 3 μm or less. By doing so, the gallium nitride particles having a substantially spherical shape can sufficiently exhibit an effect in reducing oxygen and in having a high sinterability.

Further, in a particle size distribution of secondary particles, there are multiple peaks, an apex of a peak (first peak) on a side of smallest particle sizes is 90 μm or less, and a content rate thereof is preferably 10 wt % or more of all the particles. A reason for this is that, in molding and firing, a state of secondary particles becomes important. This is because flowability and fillability depend on the particle size distribution of the secondary particles. In particular, how to improve sinterability is important for this material which has a poor sinterability, and it is important to have a particle size distribution as described above. There are preferably two peaks in the particle size distribution. An apex of a peak (first peak) on a side of smallest particle sizes is preferably 90 μm or less. As a result, particles having a high fillability are obtained. A peak size is preferably 90 μm or less, more preferably 70 μm or less, and particularly preferably 50 μm or less. A lower limit is preferably 20 μm or more, and more preferably 30 μm or more. By setting it within this range, particles having both favorable fillability and flowability can be obtained. A content rate at the peak position is preferably 10 wt % or more, and more preferably 15 wt %. As a content of secondary particles, it is preferable for improving molding and firing.

Next, a peak of large particle sizes (second peak) is preferably 100 μm or more. By forming a form in which small particles fill gaps between large particles, a sintered body having a higher density can be obtained.

Next, a method for producing the gallium nitride particles of the present invention is described.

The present invention relates to a method for obtaining gallium nitride particles by performing a nitriding treatment using gallium oxide as a starting material.

In general, when gallium nitride is produced by subjecting gallium oxide to a heat treatment in an ammonia atmosphere, as in the following formulas, first, gallium oxide ($Ga_2O_3$) is reduced to $Ga_2O$, which is vaporized, and then, the vaporized $Ga_2O$ reacts with $NH_3$ to generate gallium nitride (GaN).

$$2NH_3 \rightarrow 3H_2+N_2 \tag{1}$$

$$Ga_2O_3+2H_2 \rightarrow Ga_2O(g)+2H_2O \tag{2}$$

$$Ga_2O(g)+2NH_3 \rightarrow 2GaN+H_2O+2H_2 \tag{3}$$

In this case, the generated gallium nitride particles adhere to surfaces of the gallium oxide powder and thereby a nitriding reaction proceeds. Therefore, unreacted gallium oxide remains inside the particles, and gallium nitride exists outside the particles. As a result, a large amount of oxygen exists inside the particles. Further, in a high temperature region above 1200° C., it evaporates before a nitriding reaction of $Ga_2O$ (g) proceeds, and thus, only an extremely yield can be obtained.

In the present invention, by controlling a bulk density of gallium oxide and changing an amount of ammonia as a reaction gas, particles having desired shapes can be intentionally produced.

A light bulk density of gallium oxide used is preferably 0.2 g/cc or more, and more preferably 0.3 g/cc or more. When it is less than 0.2 g/cc, an amount of a powder that can be filled into a reaction device is small and productivity is poor. An upper limit is preferably 1.3 g/cc or less, more preferably 1.0 g/cc, and particularly preferably 0.8 g/cc. By setting it to such a range, there are many voids in the filling powder. Therefore, in an initial stage of nitriding, a nitriding reaction proceeds in the whole powder, and, in particle growth, a difference in reaction gas concentration between an upper layer and a lower layer of the filling powder occurs, and locally grown particles can be produced. Further, when the bulk density is high, the reaction does not proceed to inside, and only gallium nitride particles that contain a large amount of oxygen and have not grown are obtained.

A filling thickness of the powder is preferably a certain amount or more. As a definition of the thickness, a farthest distance between a filling surface layer and a bottom is taken as a depth, which preferably 10 mm or more, more preferably 15 mm, and even more preferably 20 mm. By doing so, especially during particle growth, gallium nitride at the bottom of the filling, where an ammonia concentration is relatively low, moves to a surface layer and particles grow easily in the surface layer portion. Also for this reason, it is necessary to use a container that can be installed at such a filling depth.

In order to further promote particle growth and reduce the oxygen content, it is preferable to add gallium nitride that has been subjected to a nitriding treatment in advance. By doing so, particle growth is promoted using a surface of the gallium nitride as a starting point, and an oxygen content can also be reduced. The filling position preferably exists at an interface between a gallium oxide powder surface and a reaction gas.

Further, regarding shapes of gallium oxide, usually, commercially available gallium oxide is in a form of needle-like crystals. However, spherical shapes are preferable. By doing so, a powder after nitriding also changes to have spherical shapes and has shapes having curved surfaces.

Purity of the gallium oxide is preferably 4N (99.99%) or more, and more preferably 5N (99.999%) or more. By doing so, it can be suitably used as a semiconductor material.

Regarding treatment temperatures of the gallium oxide, it is preferable to perform treatments by changing the temperature between a nitriding treatment and a particle growth treatment. An initial nitriding treatment temperature is preferably 1000-1100° C., and more preferably 1025-1075° C. By performing the treatment within this range, vaporization can be suppressed while gallium oxide is nitrided.

Further, the temperature for particle growth is preferably 1050-1200° C., and more preferably 1100-1150° C. By performing the treatment within this range, particles for which good particle growth and good particle size distribution are both achieved can be obtained. Further, by performing the treatment at a higher temperature, oxidation can be suppressed and particles having a lower oxygen content can be obtained.

Further, a treatment time period in the nitriding treatment is preferably 3 hours or more, and more preferably 6 hours or more. Such a time period is required for achieving complete nitridation. Since decomposition does not proceed significantly at the above reaction temperature, a yield does not change greatly, However, a time period within 60 hours is preferable from a point of view of a balance between productivity and an effect of nitriding.

A treatment time period for particle growth is preferably 3 hours or more, more preferably 6 hours or more, and particularly preferably 12 hours or more. In particle growth, when the treatment is performed for such a time period, particles can be grown to have required particle sizes. An upper limit is preferably within 100 hours, and more preferably within 50 hours. Even when a longer time period is spent, the particle sizes do not grow larger.

Regarding a flow rate of an ammonia gas, in order for a reaction to occur such that nitriding proceeds without causing decomposition into gallium in the nitriding treatment, a molar ratio of (nitrogen in ammonia)/(gallium in gallium oxide) is preferably 5 or more, and more preferably 10 or more. Further, an ammonia reaction amount per hour is preferably 1 or more times (by mole), more preferably 1.5 or more times (by mole), and particularly preferably 2 or more times (by mole) an amount of gallium charged. By doing so, a vaporization reaction of gallium oxide or a decomposition reaction of synthesized gallium nitride can be suppressed.

Regarding an ammonia reaction amount per hour in a particle growth process, since it is necessary to suppress decomposition while allowing the particles to grow, a flow rate per hour is preferably 2 or more, more preferably 3 or more, and particularly preferably 5 or more. By doing so, during particle growth at a high temperature, it is possible to allow the particle growth to proceed while suppressing decomposition.

Outermost surfaces of the produced particles may be decomposed to deposit metallic gallium. By doing so, the surfaces of the particles can be formed of curved surfaces, and oxidation from the outermost surfaces can also be suppressed. As a result, a color becomes close to gray.

The nitriding process and the particle growth process may be separate processes, but are preferably continuous processes in order to reduce oxygen by, for example, suppressing surface oxidation during removal.

Large particles of the obtained gallium nitride have plate-like shapes. The reason for this is that, unlike crystal growth starting from a normal substrate, particles grow starting from particles, and thus, the particles grow mainly in lateral directions in plate-like shapes, not along c-axes in columnar shapes. Since the particles are finally sintered into a plate-like shape, plate-like shapes are more preferable than columnar shapes.

Through such processes, particles having particle sizes of the present invention can be obtained at a high yield of 90% or more.

Effect of Invention

By using the particles of the present invention, a gallium nitride target having a low oxygen content can be produced and a gallium nitride thin film having a good crystallinity can be formed.

EXAMPLES

The present invention is specifically described using the following examples. However, the present invention is not limited to these examples.

(Measurement of Oxygen Content of Particles)

An object was thermal decomposed, and an oxygen content thereof was measured using a thermal conductivity method using an oxygen/nitrogen/hydrogen analyzer (manufactured by Leco Corporation). Since quantities in calculation are in wt %, oxygen content (atm %)=(oxygen content (wt %)/oxygen atomic weight)/((nitrogen content (wt %)/nitrogen atomic content)+(gallium content (wt %)/gallium atomic content)+(oxygen content (wt %)/oxygen atomic weight)), the nitrogen content (wt %) was measured using an oxygen/nitrogen/hydrogen analyzer (manufactured by Leco Corporation), and the gallium content (wt %) was calculated using a remainder of oxygen and nitrogen as gallium.

(Light Bulk Density)

A light bulk density of the gallium nitride particles was measured according to JISZ2504.

(Shapes [Gallium Oxide, and Gallium Nitride])

Shapes of the powered and the particles were observed using an SEM (scanning electron microscope), and the shapes were observed.

(Particle Sizes [Primary Particle Sizes])

For the primary particle sizes, first, observation was performed using an SEM at a 50×magnification, and presence or absence of particles of sizes larger than 100 µm and diameters and areas thereof were measured. Next, presence or absence of particles of sizes in a range of 10-100 µm and diameters and areas thereof were measured at a 200× magnification. Next, presence or absence of particles of sizes in a range of 5-10 µm and diameters and areas thereof were measured at a 1000× magnification. Finally, presence or absence of particles of sizes less than 5 µm and diameters and areas thereof were measured at a 5000× magnification. These measurements were each performed using at least three samples, and by combining the results, an overall particle size distribution was obtained. The particles here were those in each of which a grain boundary was not observed. Even when particles were agglomerated, when there were grain boundaries, the particles were treated as separate particles in the calculation.

(Particle Sizes [Secondary Particle Sizes])

Regarding secondary particle sizes, the following sieves were stacked in multiple stages. About 5g of particles was added from top. Shaking was performed for 10 minutes. After confirming that there were steady presence of particles at each stage, amounts of particles on the respective sieves were measured, and a particle size distribution was obtained.

Sieve openings used: 1000 µm, 355 µm, 250 µm, 150 µm, 106 µm, 90 µm, 75 µm, 53 µm, 32 µm, 25 µm, and a sieve tray.

Particle sizes of particles remaining the sieves are as follows.

355 µm sieve . . . 678 µm, 250 µm sieve . . . 303 µm, 150 µm sieve . . . 200 µm, 106 µm sieve . . . 128 µm, 90 µm sieve . . . 98 µm, 75 µm sieve . . . 83 µm, 53 µm sieve . . . 64 µm, 32 µm sieve . . . 43 µm, 25 µm sieve . . . 29 µm, sieve tray . . . 13 µm (Ammonia/Gallium Molar Ratio)

It was calculated from a ratio of the number of moles of ammonia calculated from a flow rate and a circulation time period to the number of moles of gallium in the gallium oxide or gallium nitride charged.

(Ammonia ($NH_3$) Reaction Amount Per Hour)

An ammonia reaction amount per hour was calculated from (ammonia/gallium molar ratio)/(reaction holding time).

(Yield)

A yield was calculated based on an amount obtained with respect to a gallium nitride amount estimated from an amount of the gallium oxide and gallium nitride charged.

Examples 1-2

28 g of a gallium oxide powder (4N: needle-like shapes) having physical properties shown in Table 1 was weighted and charged into an alumina container. After a filling depth at the time was measured, it was put into an atmosphere control furnace and a nitriding treatment was performed. After inside of the furnace was replaced with vacuum, ammonia was filled in at a rate of 1000 mL/min, and temperature was increased at a rate of 10° C./min and was finally raised to 1050° C. and was held for 6.5 hours (ammonia/gallium molar ratio=53.1). After the temperature was once lowered to below 200° C., further, as a particle growth treatment, ammonia was filled in at a rate of 1000 mL/min, and the temperature was raised at a rate of 10° C./min and was finally raised to 1125° C. and was held for 6 or 12 hours (a molar ratio of (ammonia)/(gallium at the time of charging) was 49 for the 6-hour treatment and 98 for the 12-hour treatment). Particles were collected, and a yield and physical properties were confirmed. The physical property values and yield of the obtained gallium nitride are shown in Table 3.

Example 3

On top of 14 g of gallium oxide powder having physical properties shown in Table 1, 14 g of gallium nitride powder having physical properties shown in Table 1 was sequentially filled. After a filling depth at the time was measured, a nitriding treatment and a particle growth treatment were performed in the same manner as in Example 2. Particles were collected, and a yield and physical properties were confirmed. The physical property values and yield of the obtained gallium nitride are shown in Table 3.

Example 4

A nitriding treatment as shown in Table 1 was performed in the same manner as in Example 2. After that, 14 g of the obtained gallium nitride was weighed and filled, and then, 14 g of gallium nitride having physical properties listed in Table 2 was further filled in a form of lamination, and, as a particle growth treatment, ammonia was filled in at a rate of 1000 mL/min, and the temperature was raised at a rate of 10° C./min and was finally raised to 1125° C. and was held for 12 hours. Particles were collected, and a yield and physical properties were confirmed. The physical property values and yield of the obtained gallium nitride are shown in Table 3.

Example 5

A nitriding treatment and a particle growth treatment were performed in the same manner as in Example 2 except that, instead of the gallium oxide powder, a spherical gallium oxide powder (4N) was used. The physical property values and yield of the obtained gallium nitride are shown in Table 3.

Example 6

Treatments were performed in the same manner as in Example 4 except that the temperature during the particle growth treatment was set to 1100° C.

Comparative Example 1

Gallium oxide was treated in the same manner as in Example 1 except that a particle growth treatment was not performed. In this case, a desired result was not obtained. The physical property values and yield of the obtained gallium nitride are shown in Table 3.

Comparative Example 2

A nitriding treatment and a particle growth treatment were performed in the same manner as in Example 2 except that, instead of the gallium oxide powder, gallium oxide (4N: spherical shapes) having a light bulk density of 2.2 g/cc was used. The physical properties and yield of the obtained gallium nitride are as shown in Table 3, and gallium nitride particles having the desired physical properties were not obtained.

TABLE 1

Nitriding Process

| | | Gallium Oxide | | Gallium Nitride Primary | | | | NH3 | | Reaction | Temperature |
|---|---|---|---|---|---|---|---|---|---|---|---|
| Example | Shape | Light bulk density g/cc | Filling amount g | particle size μm | Filling amount g | Filling depth mm | NH3/gallium molar ratio | reaction amount per hour | Reaction temperature °C. | time period hr | rising time period °C./min |
| Example 1 | Needle-like shape | 0.46 | 28 | — | — | 30 | 53.1 | 8.2 | 1050 | 6.5 | 10 |
| Example 2 | Needle-like shape | 0.46 | 28 | — | — | 30 | 53.1 | 8.2 | 1050 | 6.5 | 10 |
| Example 3 | Needle-like shape | 0.46 | 14 | 2.1 | 14 | 25 | 50.1 | 7.7 | 1050 | 6.5 | 10 |
| Example 4 | Needle-like shape | 0.46 | 84 | — | — | 30 | 17.7 | 2.7 | 1050 | 6.5 | 10 |
| Example 5 | Spherical shape | 0.76 | 28 | — | — | 22 | 53.1 | 8.2 | 1050 | 6.5 | 10 |
| Example 6 | Needle-like shape | 0.46 | 14 | 2.1 | 14 | 25 | 50.1 | 7.7 | 1050 | 6.5 | 10 |
| Comparative Example 1 | Needle-like shape | 0.46 | 84 | — | — | 30 | 17.7 | 2.7 | 1050 | 6.5 | 10 |
| Comparative Example 2 | Spherical shape | 2.2 | 28 | — | — | 8 | 53.1 | 8.2 | 1050 | 6.5 | 10 |

TABLE 2

Particle Growth Process

| | Reactant | Gallium Nitride | | | | | Reaction | Temperature | | |
|---|---|---|---|---|---|---|---|---|---|---|
| | Filling amount g | Primary particle size | Filling amount | Filling depth mm | NH3/gallium molar ratio | NH3 reaction amount per hour | Reaction temperature °C. | time period hr | rising time period °C./min | Total reaction NH3/gallium molar ratio |
| Example 1 | — | — | — | — | 49 | 8.2 | 1125 | 6 | 10 | 102.1 |
| Example 2 | — | — | — | — | 98 | 8.2 | 1125 | 12 | 10 | 151.1 |
| Example 3 | — | — | — | — | 92.4 | 7.7 | 1125 | 12 | 10 | 142.5 |
| Example 4 | 14 | 2.1 | 14 | 21 | 92.4 | 7.7 | 1125 | 12 | 10 | 110.1 |
| Example 5 | — | — | — | — | 98 | 8.2 | 1125 | 12 | 10 | 151.1 |
| Example 6 | — | — | — | — | 92.4 | 7.7 | 1100 | 12 | 10 | 142.5 |
| Comparative Example 1 | — | — | — | — | — | — | — | — | — | 17.7 |
| Comparative Example 2 | — | — | — | — | 98 | 8.2 | 1125 | 12 | 10 | 151.1 |

TABLE 3

| | | | | Primary particles | | Secondary particles | | Substantially spherical particles | |
|---|---|---|---|---|---|---|---|---|---|
| | Yield | Oxygen content Ieco | | Average particle size | 10% particle size | First peak particle size | Second peak particle size | Particle amount | Average particle size |
| | % | atm % | wt % | μm | μm | μm | μm | % | μm |
| Example 1 | 93 | 0.28 | 0.11 | 9.2 | 1.6 | 43 | 128 | 43.9 | 3.9 |
| Example 2 | 92 | 0.24 | 0.09 | 14 | 2.1 | 43 | 128 | 31 | 3.1 |
| Example 3 | 98 | 0.18 | 0.07 | 16 | 2.7 | 64 | 128 | 26 | 3.5 |
| Example 4 | 96 | 0.2 | 0.077 | 14.8 | 2.5 | 64 | 128 | 28 | 3.2 |
| Example 5 | 98 | 0.21 | 0.08 | 14 | 2.4 | 43 | 128 | 31 | 3.1 |
| Example 6 | 92 | 0.26 | 0.1 | 12 | 1.8 | 43 | 128 | 38 | 3.2 |
| Comparative Example 1 | 96 | 2.2 | 0.84 | <0.1 | <0.1 | 43 | — | — | — |
| Comparative Example 2 | 98 | 6.8 | 2.7 | <0.1 | <0.1 | 678 | — | — | — |

The present invention has been described in detail with reference to specific embodiments. However, it is apparent to a person skilled in the art that various changes and modifications can be made without departing from the nature and scope of the present invention.

The entire contents of the specification, tables, claims, drawings and abstract of Japanese Patent Application No. 2017-117465 filed on Jun. 15, 2017 are cited here, and are incorporated as disclosure of the specification of the present invention.

The invention claimed is:

1. A composition, comprising:
a plurality of gallium nitride particles including primary particles,
wherein an oxygen content is 1 atm % or less, an average particle size of the primary particles is at least 5 µm, the primary particles include substantially spherical particles, and a particle size of a range of 10 area % from smallest particles of a particle size distribution is 3 µm or less, and
wherein gallium nitride particles that have substantially spherical shapes are from 25 area % to 43.9 area % of all the gallium nitride particles.

2. The composition according to claim 1, wherein a particle size distribution of secondary particles has multiple peaks, an apex of a peak on a side of smallest particle sizes is 90 82 m or less, and a content rate thereof is at least 10 wt % of all the gallium nitride particles.

3. A sintered body, comprising:
the composition of claim 2.

4. A sintered body, comprising:
the composition of claim 1.

5. A sputtering target, comprising:
the sintered body of claim 4.

6. A method for producing a composition, the method comprising:
performing a nitriding process that reacts a mixed powder of gallium oxide and gallium nitride at a temperature of from 1000° C. to 1100° C. for at least 3 hours such that an ammonia reaction amount per hour is 1 or more times an amount by mole of gallium charged,
wherein the composition comprises
a plurality of gallium nitride particles including primary particles,
wherein an oxygen content is 1 atm % or less, an average particle size of the primary particles is at least 5 µm, the primary particles include substantially spherical particles, and a particle size of a range of 10 area % from smallest particles of a particle size distribution is 3 µm or less, and
wherein gallium nitride particles that have substantially spherical shapes are from 25 area % to 43.9 area % of all the gallium nitride particles.

7. The method according to claim 6, further comprising:
performing a particle growth process that causes a reaction at a temperature of from 1050° C. to 1200° C. for at least 3 hours such that an ammonia reaction amount per hour is 2 or more times an amount by mole of gallium charged, and that a final ammonia/gallium molar ratio is from 50 to less than 1000,
wherein the particle growth process is performed after the nitriding process at a temperature higher than the temperature of the nitriding process.

8. The method according to claim 7, wherein the nitriding process is performed at the temperature of from 1025° C. to 1075° C., and the particle growth process is performed at the temperature of from at 1100° C. to 1150° C.

9. A method for producing a composition, the method comprising:
performing a nitriding process that reacts a mixed powder of gallium oxide and gallium nitride at a temperature of from 1000° C. to 1100° C. for at least 3 hours such that an ammonia reaction amount per hour is 1 or more times an amount by mole of gallium charged,
wherein the composition comprises
a plurality of gallium nitride particles including primary particles,
wherein an oxygen content is 1 atm % or less, an average particle size of the primary particles is at least 5 82 m, the primary particles include substantially spherical particles, and a particle size of a range of 10 area % from smallest particles of a particle size distribution is 3 µm or less,
wherein gallium nitride particles that have substantially spherical shapes are from 25 area % to 43.9 area % of all the gallium nitride particles, and
wherein a particle size distribution of secondary particles has multiple peaks, an apex of a peak on a side of smallest particle sizes is 90 µm or less, and a content rate thereof is at least 10 wt % of all the gallium nitride particles.

10. The method according to claim 9, further comprising:
performing a particle growth process that causes a reaction at a temperature of from 1050° C. to 1200° C. for at least 3 hours such that an ammonia reaction amount per hour is 2 or more times an amount by mole of gallium charged, and that a final ammonia/gallium molar ratio is from 50 to less than 1,000,
wherein the particle growth process is performed after the nitriding process at a temperature higher than the temperature of the nitriding process.

11. The method according to claim 10, wherein the nitriding process is performed at the temperature of from 1025° C. to 1075° C., and the particle growth process is performed at the temperature of from 1100° C. to 1150° C.

12. The method according to claim 11, wherein the nitriding process is performed for at least 6 hours, and the particle growth process is performed for at least 6 hours.

13. The method according to claim 11, wherein the nitriding process is performed for at least 6 hours, and the particle growth process is performed for at least 12 hours.

* * * * *